3,642,982
UTILIZATION OF LIVING BACTERIA AS INSECTICIDES
Rokuya Morimoto, Neyagawa, and Reijiro Kodama, Toyonaka, Japan, assignors to Takeda Chemical Industries, Ltd., Osaka, Japan
No Drawing. Continuation-in-part of application Ser. No. 341,436, Jan. 30, 1964. This application Aug. 2, 1965, Ser. No. 476,682
Claims priority, application Japan, Feb. 2, 1963, 38/5,234; Aug. 6, 1964, 39/44,997
Int. Cl. A01n 15/00
U.S. Cl. 424—93          9 Claims

ABSTRACT OF THE DISCLOSURE

Alkalophilic and acid-producing bacteria—*Serratia piscatorum*, *Streptococcus faecalis*, *Aerobacter aerogenes*—are cultured to produce living cells which are useful insecticidally, more especially against lepidopterous larvae, such as common cabbage worm, etc.

---

The present application is a continuation-in-part of application Ser. No. 341,436 filed Jan. 30, 1964 (now abandoned).

This invention relates to a novel insecticide and to the use thereof in combating harmful insects.

Heretofore, there have been known many kinds of insecticides, for example, inorganic compounds such as arsenic agents and fluorine agents, insecticides originated from plants such as pyrethrin and nicotin, and organic synthetic insecticides such as dichlorodiphenyltrichloroethane, 1,2,3,4,5,6-hexachlorocyclohexane, diethyl-p-nitrophenyl thiophosphate, O,O - dimethyl-S-(1,2-dicarbethoxyethyl) dithiophosphate and tetraethyl pyrophosphate.

However, most of these are not used without doing harm to man and beast, and to make the matter worse, some of the known insecticides also exterminate natural enemies of noxious insects, with the result of bringing about abnormal occurrence of some kinds of noxious insects. Therefore, the hitherto known insecticides are not satisfactory.

Although many attempts have been made to overcome the aforesaid shortcomings and other disadvantages, none, as far as the present inventors are aware, has entirely been successful when applied to practical use.

It is observed that the pH of the intestinal contents of some kinds of larvae, particularly of lepidopterous larvae, is nearly 9 to 10.5. By keeping the intestinal contents at such strong alkalinity, those larvae prohibit invasion of noxious bacteria into their intestines. If alkalophilic and acid-producing bacteria are, therefore, taken into the intestines of those larvae, the bacteria multiply in the intestines, and lower the pH-value of intestinal contents, with the result of inducing flacherie-like disease. The larvae suffering from flacherie-like disease are eventually killed. Heretofore, it has been assumed that the initial pH of the medium favorable for propagation of the acid-producing bacteria capable of producing such acids as lactic acid, acetic acid, propionic acid, etc., is generally in the range of 5.0 to 7.0. For example, the optimum pH-range of the medium for the propagation of *Lactobacillus delbruckii* Beijerinck, which is well known as lactic acid bacterium, is nearly 6.7 to 7.0, and those of acetic acid and propionic acid bacteria are 5.6 to 7.0 and 5.0 to 6.7, respectively.

On the other hand, the present inventors have found that there are microorganisms which are very alkalophilic and capable as well of producing acids such as lactic acid and acetic acid, and have succeeded in isolating alkalophilic acid-producing bacteria from lepidopterous larvae such as silkworm (*Bombyx mori* L), common cabbage worm (*Pieres rapae* Boisduval), oriental moth (*Cnidocampa flavesens* Walker), *Cephonodes hylas* L, etc.

The present invention has been accomplished by applying the above-mentioned physiological change in intestinal contents which is derived from the activity of acid-producing bacteria, to practical insecticides.

It is an object of the present invention to provide new type insecticides, which contain living cells of alkalophilic acid-producing bacteria as insecticidal ingredients.

It is another object of the present invention to provide a new method for culturing alkalophilic acid-producing bacteria. Further object is to provide a novel method for killing harmful insects. Other objects and advantages will become apparent from the following description taken in conjunction with the examples.

The alkalophilic acid-producing bacteria, which are employed in the method of this invention, can be isolated from soil, various animals and plants, etc., but it is conveniently preferred to effect the isolation from such lepidopterous larvae as silkworm, common cabbage worm, oriental moth and *Cephonodes hylas* L. For, it is observed that the pH of the intestinal contents of such lepidopterous larvae is nearly 9 to 10.5 and that by keeping the intestinal contents at such strong alkalinity, such lepidopterous larvae prohibit invasion of noxious microorganisms into the intestines. Furthermore, it is observed that the pH of the intenstinal contents of such lepidopterous larvae suffering from flacherie is rather low, while that of the intestinal contents of normal insects is kept at about 10. From the above-mentioned observations, it is assumed that some kinds of alkalophilic acid-producing bacteria may be involved in the intestines of such lepidopterous larvae.

Preferably alkalophilic acid-producing bacteria which were isolated by the present inventors, i.e. *Serratia piscatorum* Breed Starin No. E 15, *Streptococcus faecalis* Andrews and Horder Strain No. G 6, *Streptococcus faecalis* Andrews and Horder Strain No. G 27, *Streptococcus faecalis* Andrews and Horder Strain No. E 5 and *Aerobacter aerogenes* Beijerinck Strain No. G 33 have the following characters:

(1) *Serratia piscatorum* Breed Strain No. E 15

Morphological characters:
  0.8 to 1.0×1.2 to 1.8 microns, having pili and peritrichous flagella. Gram-negative.

Physiological characters:
  Temperature relation: optimum 28° C., no growth at 45° C.
  Catalase reaction: positive.
  Gas production: negative.

Milk: coagulation and peptonization.
Indol: not produced.
Methyl red test: positive.
Citrate: assimilated.
Acetylmethylcarbinol: produced.
pH for growth: optimum pH 8.1 to 9.2.
Cytochrome oxidase: negative.
Hydrogen disulfide: not produced.
Salt tolerance: growth in media with 5 to 7% NaCl, no growth in 10% NaCl.
Gelatin: liquefied.
Esculin: hydrolyzed.
Urease: formed.
Pigment: rose-red.
Acid from maltose, sucrose, cellobiose, trehalose, glucose, fructose, mannose, galactose, ribose, salicin, glycerol, mannitol, adonitol, inositol.
No acid from starch, dextrin, insulin, raffinose, melezitose, lactose, melibiose, sorbose, rhamnose, arabinose, xylose, α-methylglucoside, dulcitol.
Oxygen relation: facultatively anaerobic.

Collating the above properties with the description of "Bergey's Manual of Determinative Bacteriology" 7th edition, the present inventors found that Strain No. E 15 belong to *Serratia piscatorum* Breed, though the characters of Strain No. E 15 are different from the description of the Bergey's Manual of Determinative Bacteriology in the following points:

|  | Description of Bergey's manual | *Serratia piscatorum* breed—strain No. E 15 |
|---|---|---|
| Red pigment | Visible after an incubation for 8 hours. Soluble in alcohol, some in water. Good production at 37° C. to 39° C. | Visible after an incubation for 3 to 7 days. Soluble in water, methanol, ethanol. Good production at 20 C. to 28° C., not produced at 37° C. |
| Urea | Not decomposed | Decomposed. |
| Gas | Produced from glucose | Not produced from glucose. |

(2) *Streptococcus faecalis* Andrews and Horder Strains Nos. G 6, G 27, E 5

Morphological characters:
Ovoid cells, 0.8 to 1.1 microns in a diameter, occur mostly in pairs or short chain, gram-positive, motile.

Physiological characters:
Temperature relation: growth at 10° C., no growth at 45° C.
Catalase reaction: negative.
Nitrate: not reduced.
Gas: not produced.
Litmus milk: coagulated and reduced completely before coagulation.
Tolerance test: growth in broth containing 6.5% NaCl;
growth at pH 9.6;
growth in milk containing 0.1% methylene blue;
growth on agar media containing 1/2500 K$_2$TeO$_3$.
Indol: not produced.
Methyl red test: positive.
Acetylmethylcarbinol: slightly produced.
Triphenyl tetrazolium chloride: reduced.
Hemolysis: indifferent.
Gelatin: not liquefied.
Arginine and esculin: hydrolyzed.
Sodium hippurate: not hydrolyzed.
Acid from dextrin, maltose, sucrose, lactose, melibose, cellobiose, trehalose, glucose, fructose, mannose, galactose, salicin, mannitol, sorbitol.
No acid from starch, inulin, melezitose, rhamnose, sorbose, arabinose, α-methylglucoside, glycerol, dulcitol, inositol, adonitol, citrate, gluconate.
Homofermentative.
Folic acid essentially required for growth.

Collating the above properties with the description of "Bergey's Manual of Determinative Bacteriology" 7th edition, the present inventors found that Strains Nos. G 6, G 27 and E 5 belong to *Streptococcus faecalis* Andrews and Horder, though these strains have different characters from the description of the Bergey's Manual of Determinative Bacteriology in the following points:

| Description of Bergey's manual | Strains Nos. G 6, G 27 and E 5 |
|---|---|
| Growth at 45° C | Growth at 10° C., no growth at 45° C. |
| Acid from glycerol | No acid from glycerol. |
| Considerably more tolerant to penicillin than the other streptococci. | Not susceptible to penicillin. |

It is interesting that, though Strains Nos. G 6, G 27 and E 5 have quite the same characters from the viewpoints of microbial characters, kinds of diseases of insect caused by appyling these Strains are different from each other.

(3) *Aerobacter aerogenes* Beijerinck Strain No. G 33

Strain No. G 33, which was identified taxonomically as *Aerobacter aerogenes* Beijerinck, is different from the corresponding description in Bergey's Manual of Determinative Bacteriology in the following characters:

| Bergey's manual | Strain No. G 33 |
|---|---|
| Acid and gas from starch or arabinose. | Neither acid nor gas from starch or arabinose. |

The alkalophilic acid-producing bacteria employed in this invention are harmless and non-toxic to human beings, beasts or plants.

Alkalophilic acid-producing bacteria are cultured in alkaline medium containing such nutrients for the growth of the bacteria as carbon sources, nitrogen sources, inorganic substances and, if necessary, vitamins, other growth promoting factors, etc. Among the carbon sources, there are enumerated starch, cane sugar, lactose, dextrin, glycerol, maltose, etc. As the nitrogen sources there can can be used various organic or inorganic substances such as soybean meal, meat extracts, peptone, casein hydrolysate, yeast extracts, corn steep liquor, etc. As inorganic nutrients, for example, potassium phosphates, magnesium sulfate, ferrous and ferric chlorides, calcium carbonate, etc. are usually employed. As the constituents of the medium vary also with kind of bacteria to be employed, it is preferable to choose a proper medium case by case. Among the alkaline agents to be used to adjust the pH of the medium, there are, for example, enumerated alkali metal hydroxides such as sodium hydroxide and potassium hydroxide and alkali metal carbonates such as sodium carbonate and potassium carbonate. The culture medium is adjusted to higher than pH 9, preferably to pH 10 to 11. The culture medium may be solid or liquid. It is desirable that cultivation of the bacteria be carried out under anaerobic conditions; while the time for the cultivation varies with the kind of bacteria and cultured media to be used, about 2 to 3 days' cultivation will usually bring most preferable yield.

The living cells of thus cultured bacteria are available new type insecticides, which are harmless to man and beast and are effective for combating the objective noxious insects, particularly for lepidopterous larvae.

In general it is especially preferable to use the living cells of *Serratia piscatorum* Breen Strain No. E 15, as the insecticidal effect of *Serratia piscatorum* Breen Strain No. E 15 is strongest among the alkalophilic acid-producing bacteria.

The insecticides of the present invention contain one or more kinds of the alkalophilic acid-producing bacteria.

For the present insecticides, the culture itself may be used without isolating the cells, or the culture may be applied to the insecticides after having been subjected to such procedures as dilution, concentration, filtration, centrifugal separation and freeze-drying. The cultures or mixture containing living cells of the objective bacteria may be put into use in the form of compositions such as dust, emulsion or suspension by being admixed with such a carrier or carriers as talc, clay, diatomaceous earth, lime, kaolin, carbon, wheat flour, surface active agents, and the like, so long as they do not prejudice the survival of the living cells.

As the alkalophilic acid-producing bacteria survive by being kept in a lyophilized state, dried powder of culture broth or of the bacterial cells obtained by e.g. freeze-drying is usually especially preferable from the viewpoint of practical application.

The living cells or mixture containing the living cells may be used by being admixed with other kinds of insecticides or pesticides, herbicides, plant growth regulators, attractants, manures, and the like, if these are harmless to the living cells of the bacteria employed.

Generally speaking, a dust composition containing the alkalophilic acid producing bacteria for direct application may contain from about 50 to 500 grams of living cells of the alkalophilic acid producing bacteria per hectare. It is preferable for practical application to employ the dust composition an an amount of 10 to 100 kilograms per hectare. Generally, the content of living cells of the alkalophilic acid producing bacteria in the insecticide is preferably 0.05 to 5 weight percent.

For the purpose of giving those skilled in the art a better understanding of the invention, the following illustrative examples of presently preferred embodiments are given:

EXAMPLE 1

For the purpose of determination of the optimum pH-range of the medium for the growth of these alkalophilic acid-producing bacteria, an aqueous medium composed of the following ingredients was used: dried extract of yeast, 0.5%; peptone, 0.5%; glucose, 2%; inorganic salts ($KH_2PO_4$, 0.05%; $K_2HPO_4$, 0.05%; $MgSO_4 \cdot 7H_2O$, 0.02%; $MnSO_4 \cdot 4H_2O$, 0.001%; NaCl, 0.001%; $FeSO_4 \cdot 7H_2O$, 0.001%). (Percentages are by weight.)

After the medium was autoclaved under a steam pressure of 20 pounds for 15 minutes, the pH of the medium was adjusted aseptically to various values shown in Table 1 with 5 N HCl and 5 N NaOH.

These media of various pH-values were inoculated with one drop of each suspension separately, which was prepared by suspending each strain of alkalophilic acid-producing bacteria in a physiological saline solution, and were incubated at 28 to 30° C. for 24 to 90 hours. Growth was measured turbidimetrically by a Coleman spectrophotometer (675 m$\mu$). The results are summarized in Table 1.

TABLE 1

| | Strains | | | |
|---|---|---|---|---|
| | Strain of Streptococcus faecalis (ATCC 15336) | | Strain of Aerobacter aerogenes (ATCC 15337) | |
| Incubation time (hrs.) | 45 | 90 | 24 | 72 |
| Optical density at pH— | | | | |
| 4.10 | | | 0 | 0.186 |
| 4.40 | 0 | 0 | | |
| 4.90 | 0.074 | 0.098 | | |
| 5.25 | | | 0.185 | 0.391 |
| 5.45 | 0.122 | 0.123 | | |
| 5.90 | 0.148 | 0.151 | | |
| 6.40 | | | 0.205 | 0.510 |
| 6.95 | 0.160 | 0.183 | | |
| 7.30 | | | 0.280 | 0.512 |
| 7.75 | 0.201 | 0.231 | | |
| 8.65 | | | 0.325 | 0.585 |
| 8.80 | 0.272 | 0.302 | | |
| 9.10 | | | 0.325 | 0.545 |
| 9.15 | 0.290 | 0.328 | | |
| 9.60 | 0.330 | 0.338 | | |
| 9.65 | | | 0.275 | 0.525 |
| 10.05 | | | 0 | 0.315 |
| 10.40 | 0.316 | 0.363 | | |
| 11.35 | 0 | 0.394 | | |

EXAMPLE 2

To the medium of the same composition as in Example 1 was added cow-liver autolysate. Thus prepared medium was put into use in the present example. Growth of bacteria was measured in the same way as in Example 1. The results are shown in Table 2.

TABLE 2

| | A strain of Streptococcus faecalis (ATCC 15336) | |
|---|---|---|
| Incubation time (hrs.) | 45 | 90 |
| Optical density at pH— | | |
| 4.45 | 0 | 0 |
| 4.95 | 0.051 | 0.100 |
| 5.35 | 0.118 | 0.120 |
| 5.90 | 0.161 | 0.165 |
| 6.90 | 0.183 | 0.220 |
| 7.85 | 0.269 | 0.310 |
| 8.80 | 0.372 | 0.418 |
| 9.35 | 0.439 | 0.482 |
| 9.90 | 0.490 | 0.552 |
| 10.30 | 0.518 | 0.608 |
| 10.80 | 0.515 | 0.628 |
| 11.50 | 0 | 0.648 |

EXAMPLE 3

Bacteria:
  Streptococcus faecalis (ATCC 15335) --- (1)
  Streptococcus faecalis (ATCC 15336) --- (2)
  Aerobacter aerogenes (ATCC 15337) ---- (3)

Insect: Common cabbage worm larvae (*Pieris rapae*)

Test method: Common cabbage worms were reared in a Petri-dish with cabbage on which the above-mentioned bacteria were inoculated at a constant temperature of 25° C. Then the number of those which died or flacherie was counted.

Result:

| | Total insects | Dead insects | Mortality (percent) |
|---|---|---|---|
| Bacteria: | | | |
| (1) | 20 | 20 | 100 |
| (2) | 20 | 20 | 100 |
| (3) | 20 | 15 | 75 |
| Control (no bacteria) | 20 | 1 | 5 |

EXAMPLE 4

Bacteria: The same as those in Example 3
Insect: Rose of Sharonleaf-like moth
Test method: The same as that in Example 3
Result:

| | Total insects | Dead insects | Mortality (percent) |
|---|---|---|---|
| Bacteria: | | | |
| (1) | 20 | 1 | 5 |
| (2) | 20 | 20 | 100 |
| Control (no bacteria) | 20 | 0 | 0 |

In the following examples, parts are by weight.

EXAMPLE 5

A powder comprising 2 parts of freeze-dried powder of living cells of Streptococcus faecalis (ATCC 15335) and 98 parts of talc, according to the invention, is useful in killing noxious insects.

EXAMPLE 6

A wetting powder comprising 5 parts of freeze-dried powder of living cells mixture of Streptococcus faecalis (ATCC 15336) and Aerobacter aerogenes (ATCC 15337)—the ratio on the weight basis of the former to the latter in the mixture being 2:1—40 parts of bentonite, 40 parts of sucrose, 10 parts of talc and 5 parts of alkylaryl sulfonic acid, according to the invention, is useful in killing noxious insects.

EXAMPLE 7

Bacteria: Serratia piscatorum Breed Strain No. E 15 (ATCC No. 17999); Streptococcus faecalis Andrews and Horder Strain No. E 5 (ATCC No. 19000)

Insect: Common cabbage worms (*Pieris rapae*) 4th instar

Test method: Common cabbage worms were reared in a Petri-dish with cabbage on which the above-mentioned bacteria were inoculated at a constant temperature of 25° C. Then the number of those which died of flacherie was counted.

Results:

| | Bacteria | | | | | | | |
|---|---|---|---|---|---|---|---|---|
| | Strain No. E 15 | | Strain No. E 5 | | Strain No. E 5 plus Strain No. E 15 | | Control | |
| Days | Survived insect (number) | Dead insect (number) | Survived insect (number) | Dead insect (number) | Survived insect (number) | Dead insect (number) | Survived insect (number) | Dead insect (number) |
| 1st | 20 | 0 | 20 | 0 | 20 | 0 | 20 | 0 |
| 2nd | 18 | 2 | 20 | 0 | 17 | 3 | 20 | 0 |
| 3rd | 8 | 12 | 20 | 0 | 8 | 12 | 20 | 0 |
| 4th | 0 | 20 | 18 | 2 | 0 | 20 | 20 | 0 |
| 5th | | | 10 | 10 | | | 20 | 0 |
| 6th | | | 4 | 16 | | | 20 | 0 |
| Mortality (percent) | 100 | | 80 | | 100 | | 0 | |

EXAMPLE 8

A powder comprising 2 parts by weight of freeze-dried living cells of *Serratia piscatorum* Breed Strain No. E 15 (ATCC No. 17999) and 98 parts by weight of talc, is useful in killing noxious insects.

EXAMPLE 9

A wetting powder comprising 5 parts by weight of freeze-dried living cells of a mixture of *Streptococcus faecalis* Andrews and Horder Stain No. E 5 (ATCC No. 19000) and *Serratia piscatorum* Breed Strain No. E 15 (ATCC No. 17999) in the ratio of 2:1, 40 parts by weight of bentonite, 40 parts by weight of sucrose, 10 parts by weight of talc and 5 parts by weight of alkylarylsulfonic acid, is useful in killing noxious insects.

What is claimed is:

1. An insecticidal composition containing living bacteria consisting essentially of an inert insecticidal carrier and *Serratia piscatorum* ATCC No. 17999 or *Streptococcus faecalis* ATCC Nos. 15335, 14336 and 19000, the living bacterium being present in an amount of 0.05 to 5 weight percent.

2. An insecticidal composition according to claim 1, wherein the carrier is the culture medium in which the bacterium was grown.

3. An insecticidal composition according to claim 1, wherein the carrier is the dried culture medium in which the bacterium was grown.

4. The composition of claim 1, wherein the living cells are cells of *Serratia piscatorum* Breed ATCC No. 17999.

5. The composition of claim 1, wherein the living cells are cells of *Streptococcus faecalis* Andrews and Horder ATCC No. 15335.

6. The composition of claim 1, wherein the living cells are cells of *Streptococcus faecalis* Andrews and Horder ATCC No. 15336.

7. The composition of claim 1, wherein the living cells are cells of *Streptococcus faecalis* Andrews and Horder ATCC No. 19000.

8. A method of combating lepidopterous larvae with living bacteria which comprises applying to the habitat thereof an insecticidally effective amount of *Serratia piscatorum* ATCC No. 17999 or *Streptococcus faecalis* ATCC No. 15335, 15336 and 19000.

9. The method according to claim 8 wherein the habitat is soil and the amount applied is from 50 to 500 grams per hectare.

References Cited

UNITED STATES PATENTS

| 3,086,922 | 4/1963 | Mechalas | 195—96 |
| 3,087,865 | 4/1963 | Drake et al. | 195—96 |
| 3,123,538 | 3/1964 | Shirota et al. | 195—48 |
| 3,261,761 | 7/1966 | Anderson | 195—96 |
| 3,271,243 | 9/1966 | Cords et al. | 167—22 |

OTHER REFERENCES

Chemical & Engineering News, 36:51, Dec. 22, 1958, p. 15.

JEROME D. GOLDBERG, Primary Examiner

V. D. TURNER, Assistant Examiner